O. K. BOYETT.
BROOM.
APPLICATION FILED AUG. 7, 1919.
1,412,653.
Patented Apr. 11, 1922.
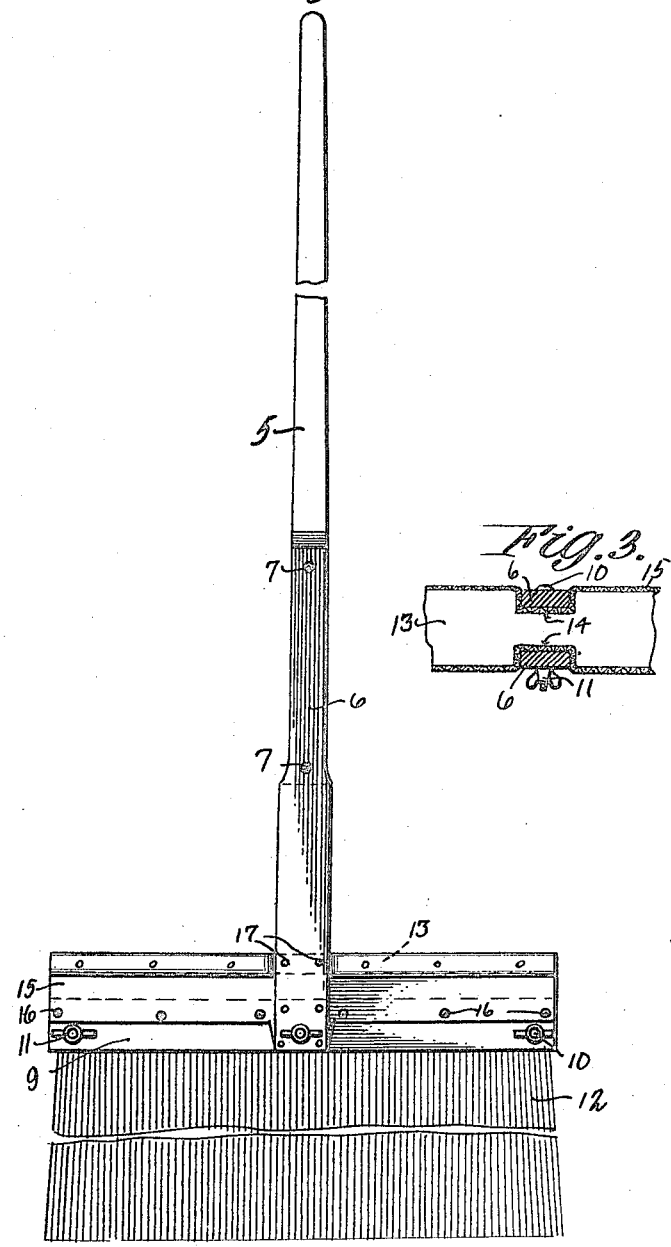
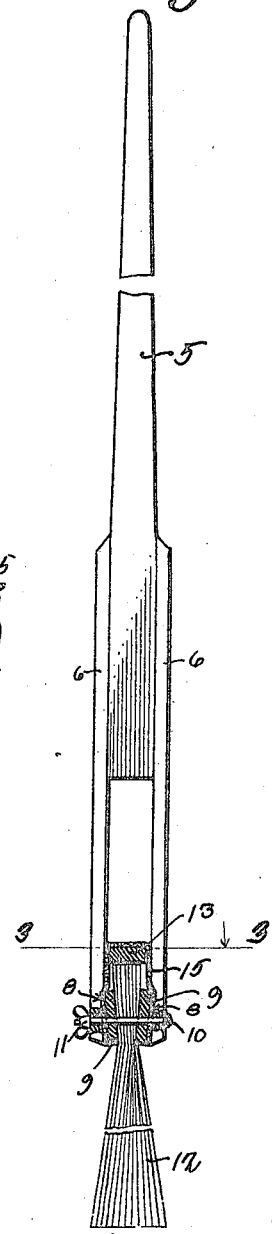
Inventor
OREN K. BOYETT

UNITED STATES PATENT OFFICE.

OREN K. BOYETT, OF DOUCETTE, TEXAS.

BROOM.

1,412,653. Specification of Letters Patent. Patented Apr. 11, 1922.

Application filed August 7, 1919. Serial No. 315,924.

*To all whom it may concern:*

Be it known that I, OREN K. BOYETT, a citizen of the United States, residing at Doucette, in the county of Tyler and State of Texas, have invented certain new and useful Improvements in Brooms, of which the following is a specification.

This invention is a broom and has for its object the production of a simple and efficient head for devices of this nature.

Another object of this invention is the production of a broom wherein a plurality of clamping jaws are mounted upon the handle by suitable supporting bars together with means for drawing the jaws toward each other, whereby straw may be inserted between the jaws and clamped in position, thus allowing the straw to be replaced as often as desired and at a minimum expense, very easily.

Another object of this invention is the production of a broom wherein the jaws are provided with a top bar connected thereto, thus providing a reinforcement for the inner ends of the straws, constituting the broom head, and clamped between the jaws to prevent the straws from sliding upwardly through the jaws when considerable pressure is applied to the broom.

One practical form of construction and assembly of the present invention will be hereinafter described, and is illustrated in the drawing, in which—

Figure 1 is a front elevation of the broom in condition for use, the straw portion being partly broken away.

Figure 2 is a view taken in vertical section and at right angles to the first figure.

Figure 3 is a fragmentary sectional view taken on the line 3—3 of Figure 2.

In the preferred embodiment of the present invention about to be specifically described, 5 indicates the handle having supporting bars 6 engaging opposite side surfaces thereof and secured in place by securing elements 7. These supporting bars 6 are parallel to each other throughout their entire length and extend for a considerable distance below the lower end of the handle 5. The lower ends of these bars have notches 8 which are inclined outwardly toward their upper portions as illustrated clearly in Figure 2.

The jaws 9 are elongated and extend transversely across the lower ends of the supporting bars 6 as shown in Figure 1. These jaws are received within the notches and for this reason converge toward their lower edges as shown in Fig. 2. Bolts 10 pass through the jaws 9 adjacent their ends and also through the jaws and bars as shown in Figures 1 and 2 being adapted to receive upon their projecting ends winged nuts 11, whereby the nuts may be rotated upon the bolts so as to draw the jaws 9 together and clamp a quantity of broom straw 12 between the jaws. Since the jaws converge toward their lower edges, it is obvious the clamping action will be greatest at this point and will therefore tend to firmly hold the straw, which might not be accomplished if the jaws were parallel to each other in a vertical manner. The broom straw 12 constituting the head of the broom may be of any desired length and depends for a considerable distance below the jaws so that it may be placed easily upon a surface to be swept.

A top bar 13 is provided and extends transversely between the supporting bars 6. The side edges of this top bar 13 are notched at 14 and thus provides sufficient space for the reception of the supporting bar 6. This top bar is supported against displacement by a hood 15, formed of flexible material, such as leather, or if desired fabric may be used, which is fitted over the top bar 13 and is brought down and secured upon the outer surfaces of the jaws by suitable securing elements 16 as shown in Figure 1. Thus pressure may be applied to the top bar 13 and although it will rise between the side bars 6 in the event no securing means are provided, nevertheless this top bar will be firmly held from displacement by the hood. In the event securing means is employed as shown in Figure 1 at 17, the hood will relieve the securing means of considerable strain and will keep the end portions of the top bar from having a tendency to pivot upwardly in the event additional pressure is applied to one end thereof, whereby the top bar will be held at all times parallel to the jaws 9 and thus cause the straw 12 to have a firm upper support so that as pressure is applied to the straw it will not have a tendency to be pushed upwardly between the jaws, as the top bar will reinforce the upper ends of the jaws to prevent this action, while the hood 15 will prevent the upper ends of the straw from springing to one side and being displaced.

From the foregoing description it will be seen that a broom is provided wherein the head is so constructed as to allow the broom-straws to be removed when desired and new ones inserted in lieu of the old ones, thus providing a broom which to all intent and purposes is new for the life of the broom depends upon the straws, which when worn cause the handles and other parts of the broom to be thrown away although when using the present device after the straws have been unduly worn they may be replaced by new straws and the broom be in condition again for use. In order to remove the straws 12, the winged nuts 11 are loosened, thus allowing the jaws 9 to be swung apart, whereupon the old straw may be removed and new inserted between the jaws in lieu thereof. The nuts 12 may be again tightened and at this time the straws may be moved rearwardly until they abut against the top bar 13, whereupon the nuts 11 may be tightened to their fullest extent to cause the jaws 9, which converge their lower edges to be drawn together as near as possible and thus produce a binding action upon the straws 12 which prevents displacement of the straws. Thus the straws will be efficiently held in an operative position by the jaws and the top bar, which cooperate to bring both the straws and hold the same in position to make the broom head very firm. The broom structure exclusive of the straws may be repeatedly used simply by including new straw in place of old or worn straw on the broom head, the operation, as is obvious being accomplished by any person very easily, as no skill is required for the substitution of new straw in the manner specified.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent is:—

1. A brush of the class described comprising a handle having supporting bars at its lower end, a head comprising a top bar provided with notches for receiving said handle supporting bars, whereby said top bar will be held against swinging movement with respect to said handle, a plurality of flexible jaws carried by said top bar, a brushing medium adapted to be fitted between said jaws, reinforcing means carried along the lower edge of said jaws, and clamping means for firmly binding said brushing medium between said jaws.

2. A brush of the class described comprising a handle having supporting bars at its lower end, a top bar provided with notches formed upon each side thereof intermediate the ends for receiving said handle supporting bars, a plurality of elongated jaws, a flexible hood extending over said top bar and engaging said jaws, a brushing medium interposed between said jaws, means for clamping said jaws in firm engagement with said brushing medium, and means extending through said handle and jaws for firmly clamping said handle in engagement therewith.

3. A brush of the class described comprising a handle having supporting bars at its lower end, a top bar provided with a notch formed intermediate the ends thereof for receiving said handle supporting bars, a plurality of gripping jaws, a flexible hood carried by said top bar and engaging said jaws, a brushing medium interposed between said jaws, means passing through said jaws and brushing medium for firmly clamping the brushing medium in engagement with said jaws, and means for securing said handle to said jaws whereby the handle will be held in a position substantially at right angles to said jaws.

In testimony whereof I affix my signature in presence of two witnesses.

OREN K. BOYETT.

Witnesses:
E. H. HOPSON,
WM. MCCREADY.